United States Patent
Buckman et al.

[15] 3,671,641

[45] June 20, 1972

[54] METHODS OF COMBATTING BACTERIA AND FUNGI USING CYANOALKYL ESTERS OF 2-HALOACRYLIC AND 2,3-DIHALO PROPIONIC ACIDS

[72] Inventors: John D. Buckman; John D. Pera; Fred W. Raths, all of Memphis, Tenn.

[73] Assignee: Buckman Laboratories, Inc., Memphis, Tenn.

[22] Filed: Jan. 2, 1969

[21] Appl. No.: 789,082

[52] U.S. Cl. ................................424/304, 424/302, 424/311, 424/314
[51] Int. Cl. ...........................................A01n 9/20
[58] Field of Search ..................424/302, 311, 314, 304; 260/465.4

[56] References Cited

UNITED STATES PATENTS

| | | | |
|---|---|---|---|
| 2,461,990 | 2/1949 | Lichty | 260/84.5 |
| 3,151,020 | 9/1964 | Cruickshank | 162/190 |
| 3,181,992 | 5/1965 | Michalski et al | 167/38.6 |
| 3,397,144 | 8/1968 | Liu | 210/62 |

FOREIGN PATENTS OR APPLICATIONS

| | | | |
|---|---|---|---|
| 389,896 | 6/1963 | Japan | 424/311 |
| 1,036,564 | 8/1958 | Germany | 424/314 |

OTHER PUBLICATIONS

Licthy, Chem. Abst. Vol. 37, 66777, 1943.
Kelly, Mew Chem. Formulation Will Control Microorganisms in Hydrocarbon Contaminated Cooling Water Systems, Materials Protection, July, 1965, pages 62– 64, 67.

*Primary Examiner*—Albert T. Meyers
*Assistant Examiner*—Allen J. Robinson
*Attorney*—Floyd Trimble

[57] ABSTRACT

Substituted alkyl esters of 2-haloacrylic and 2,3-dihalo propionic acids and their use in controlling micro-organisms, nematodes, and insects are described.

7 Claims, No Drawings

METHODS OF COMBATTING BACTERIA AND FUNGI USING CYANOALKYL ESTERS OF 2-HALOACRYLIC AND 2,3-DIHALO PROPIONIC ACIDS

This invention relates to certain organic esters, their preparation, and their use as pesticides in controlling the growth and reproduction of micro-organisms, nematodes, and insects. More particularly, the products of this invention are useful for the control of slime-forming and other micro-organisms in industrial processes involving water and substances that are normally susceptible to microbiological degradation or deterioration in the presence of water in which the growth and proliferation of such micro-organisms interfere in the process itself or affect the quality or character of the resulting product.

Many industrial products when wet or when subjected to treatment in water are normally susceptible to bacterial and/or fungal degradation or deterioration if means are not taken to inhibit such degradation or deterioration. Wood pulp, wood chips, starch and proteinaceous substances, animal hides, vegetable tanning liquors, and leather are all damaged or degraded by growth of bacteria and other micro-organisms or by enzymes produced by such growth. Wet pulp containing above 25 percent moisture content is subject to attack by stain, mold, and decay fungi. If not controlled, the result is a loss of useful fiber in badly decayed pulp, difficulty in dispersing partially decayed pulp, a darkening in color, and the development of undesirable odors caused by the growth of the micro-organisms. Different species of molds are encountered at various stages in the manufacture of leather. As an example, soaking provides an environment highly conducive to the growth of micro-organisms, and even strong pickle solutions are subject to attack by some micro-organisms. Molds in particular may be troublesome and cause discoloration of the pickled stock, especially if it is held for a period of time. During the chrome tanning process, the chrome tanned stock held "in the blue" readily molds and is discolored. Mold growth may develop on heavy vegetable tanned leather during the drying period and produce spots and stains on either the flesh or grain sides.

Another objectionable phenomenon occurring in industrial process systems involving water is slime formation. Slime consists of matted deposits of micro-organisms, fibers, and debris, and it may be stringy, pasty, rubbery, tapioca-like, hard, or horny, and it may have a characteristic odor that is different from that of the liquid suspensions in which it is formed. The micro-organisms involved in its formation are primarily different species of spore-forming and non-spore-forming bacteria, particularly capsulated forms of bacteria which secrete gelatinous substances that envelop or encase the cells. Slime micro-organisms also include filamentous bacteria, filamentous fungi of the mold type, yeasts, and yeast-like organisms.

Besides being objectionable from the standpoint of general cleanliness and sanitation in breweries, wineries, dairies, papermills and other industrial plants or establishments, slime may interfere and produce plugging of screens in pulp and paper systems, thus reducing their efficiency. When large amounts of slime becomes incorporated in the paper sheet, its strength is reduced, and it may consequently break and require rethreading of the machine. In the paper itself, slime may be responsible for unsightly spots, holes, and odors and may produce general discoloration throughout the sheet.

The organic esters of this invention are also effective in controlling the growth and proliferation of sulfate-reducing bacteria. This is not only highly desirable but very unexpected because it has been extremely difficult to control the growth of sulfate-reducing bacteria by means of bactericides. In this regard, reference is made to the paper by G. J. Guynes and E. O. Bennett titled "The Sensitivity of Sulfate-Reducing Bacteria to Anti-Bacterial Agents," published in Producers Monthly, November 1958. These authors studied the effects of 28 organomercurial compounds and 63 phenolic compounds on such bacteria. Of the organomercurial compounds, none inhibited the growth of sulfate-reducing bacteria at concentrations as low as 50 parts per million. This is true despite the fact that organomercurial compounds are generally the most effective and versatile bacteriostatic compounds known. In many cases, these compounds will inhibit the growth of bacteria other than sulfate-reducing bacteria at a concentration of less than 1 part per million. Of the phenolic compounds studied, also known for their general effectiveness, only three reduced the growth of sulfate-reducing bacteria at concentrations as low as 25 parts per million.

When employed in agriculture, the organic esters of our invention are used as seed, plant, and soil pesticides for protecting seeds, seedlings emerging from seeds, and plants against attack by bacteria, fungi, nematodes, and insects.

As to the amount of the organic esters to be added to the aqueous system, a suitable quantity varies from 0.5 to 1,000 parts per million parts of moisture-free organic material. It will be understood, of course, that larger quantities of the organic esters may be used with no detrimental effect, but such larger quantities increase the costs of operation with limited material benefit.

It is, therefore, a principal object of the present invention to provide new processes for the control of pests which obviate the disadvantages of prior art processes.

It is another object of our invention to provide processes for the control of microorganisms, nematodes, and insects in agricultural and industrial process systems.

These and other objects and advantages of the processes will become apparent as the description proceeds.

To the accomplishment of the foregoing and related ends, this invention then comprises the features hereinafter fully described and particularly pointed out in the claims, the following description setting forth in detail certain illustrative embodiments of the invention, these being indicative, however, of but a few of the various ways in which the principles of the invention may be employed.

In brief, the foregoing objects and advantages are attained by the use of an organic compound as a pesticide to inhibit the growth and proliferation of microorganisms, nematodes, and insects. The organic compound is further defined as an ester wherein the alcohol group of said ester is a substituted alkyl containing one to four carbon atoms and at least one of the hydrogens thereof is substituted by OH, Br, Cl, CN, SCN, methoxy, or ethoxy and the acid group is 2-bromacrylic acid, 2-chloroacrylic acid, 2,3-dibromopropionic acid, or 2,3-dichloropropionic acid.

The esters as defined above may be prepared by the bromination or chlorination of a substituted alkyl acrylate in an inert organic solvent. Examples of suitable inert solvents—but not as a limitation thereof—include carbon tetrachloride, chloroform, and methylene chloride.

Another method of preparing these esters involves the transesterification of a lower alkyl 2,3-dibromo- or 2,3-dichloropropionate with a substituted alkanol in the presence of an acid catalyst.

A third method of preparing these esters involves the reaction of a 2-haloacrylic acid or a 2,3-dihalopropionic acid with a substituted alkanol in the presence of an acid catalyst. As used herein, "halo" is limited to bromo- and chloro-.

EXAMPLE 1

β-Chloroethyl 2,3-dibromopropionate

A 2-liter round-bottom flask fitted with a mechanical stirrer, addition funnel, and condenser was charged with 500 milliliters of methylene chloride and 168 grams (1.05 moles) of bromine. Then 134.5 grams (1.0 mole) of β-chloroethyl acrylate was added dropwise from an addition funnel to the flask while the contents thereof were stirred. After all the β-chloroethyl acrylate had been added, stirring of the reaction mixture was continued overnight at room temperature. At the end of the period, the reaction mixture was allowed to stand in the sunlight for 15 minutes and then the solvent was removed on a flash evaporator. The crude β-chloroethyl 2,3-dibromopropionate which remained as a residue weighed 253.6 grams, representing an 86 percent yield. The crude product was distilled under reduced pressure to give pure β-chloroethyl 2,3-dibromopropionate, b.p. 95°–8° C. (1.1 mm.), $n_D^{24}$ 1.5241. Anal. calcd. $C_5H_7Br_2ClO_2$: Cl, 12.1; Br, 54.3; C, 20.4; H, 2.38. Found: Cl, 11.7; Br, 54.1; C, 20.5; H, 2.45.

EXAMPLE 2

β-cyanoethyl 2,3-dibromopropionate having the following properties:
b.p. 156°–65° C. (0.5–0.6 mm.)
$n_D^{25}$ 1.5155
Anal. calcd. $C_6H_7Br_2NO_2$: Br, 56.1; N, 4.9; C, 25.3; H, 2.48
Found: Br, 55.3; N, 5.1; C, 26.3; H, 2.59 was prepared by the bromination of β-cyanoethyl acrylate following the procedure described in Example 1.

EXAMPLE 3

β-cyanoethyl 2,3-dichloropropionate having the following properties:
b.p. 150°–3° C. (0.8 mm.)
$n_D^{24}$ 1.4728
Anal. calcd. $C_6H_7Cl_2NO_2$: Cl, 36.2; N, 7.1
Found: Cl, 33.1; N, 7.5 was prepared by the chlorination of β-cyanoethyl acrylate by the procedure described in Example 1. Since the chlorination of the acrylate is a very slow reaction in the absence of a halogenation catalyst, we prefer to use dimethyl formamide as such a catalyst during the chlorination process.

EXAMPLE 4

β-Bromoethyl 2,3-dibromopropionate

A 500 ml. round-bottom flask fitted with a magnetic stirrer, thermometer, and distillation head was charged with 254 grams (1.0 mole) of methyl 2,3-dibromopropionate, 126 grams (1.0 mole) of 2-bromoethanol, and 2 milliliters of concentrated sulfuric acid. After adjusting the flask for distillation, the reaction mixture was heated and 26 grams (1.0 mole) of methanol (b.p. 65°–70° C.) was removed by distillation. The crude residue was then distilled under reduced pressure to give 54.3 grams β-bromoethyl 2,3-dibromopropionate, b.p. 95°–6 C. (0.35 mm.), $n_D^{24}$ 1.5410. Anal. calcd. $C_5H_7Br_3O_2$: C, 17.7; H, 2.08; Br, 70.8. Found: C, 18.1; H, 2.06; Br, 70.8.

EXAMPLE 5

β-Cyanoethyl 2-bromoacrylate

A 500 ml. round-bottom flask fitted with a stirrer, thermometer, and reflux condenser was charged with 57 grams (0.2 mole) of β-cyanoethyl 2,3-dibromopropionate, 21.2 grams (0.2 mole) of sodium carbonate, 5 grams of hydroquinone, and 200 milliliters of acetone. The reaction mixture was heated at reflux temperature for 2 hours with stirring, cooled to room temperature, and then the acetone was removed by flash evaporation. The residue was added to 200 milliliters of methylene chloride, the resulting solution washed twice with 500 milliliters of water, dried over magnesium sulfate, filtered and then the methylene chloride removed by flash evaporation to give 31.8 grams of β-cyanoethyl 2-bromoacrylate, b.p. 105° C. (1.5 mm.). This represented a 79.5 percent yield. Anal. calcd. $C_6H_6BrNO_2$: Br, 39.2; N, 6.9. Found: Br, 36.5; N, 7.0.

EXAMPLE 6

The organic esters listed in Table 1 were tested by the pulp-substrate method described in U.S. Pat. No. 2,881,070, which disclosure is hereby made a part of this application using *Aerobacter aerogenes* and pulp substrates that were buffered to pH values of 5.5, 6.5, and 7.5, respectively. The results are tabulated in Table 1.

TABLE 1

Percentage kill of *Aerobacter aerogenes* in a pulp substrate at pH 5.5, 6.5, and 7.5 after 18 hrs. contact with the compounds listed below

| pH | Concentration, parts per million | β-Chloroethyl 2,3-dibromopropionate | Cyanomethyl 2,3-dibromopropionate | β-Cyanoethyl 2-bromoacrylate | β-Cyanoethyl 2,3-dichloropropionate | β-Cyanoethyl 2,3-dibromopropionate | β-Hydroxyethyl 2-bromoacrylate | β-Hydroxypropyl 2-bromoacrylate | β-Hydroxyethyl 2,3-dibromopropionate |
|---|---|---|---|---|---|---|---|---|---|
| 5.5 | 0.5 | 5 | 13 | 0 | 29 | 34 | 27 | 3 | 5 |
|  | 1 | 40 | 53 | 18 | 9 | 27 | 41 | 18 | 48 |
|  | 2 | 19 | 99 | 71 | 25 | 21 | 95 | 11 | 52 |
|  | 4 | 0 | 99 | 98 | 26 | 89 | 99 | 29 | 88 |
|  | 8 | 34 | 99.9 | 98 | 70 | 99.99 | 99.9 | 99 | 99.6 |
| 6.5 | 0.5 | 60 | 16 | 34 | 17 | 16 | 22 | 3 | 34 |
|  | 1 | 24 | 29 | 13 | 0 | 40 | 5 | 32 | 0 |
|  | 2 | 8 | 97 | 37 | 28 | 66 | 98 | 18 | 77 |
|  | 4 | 5 | 99.9 | 99.5 | 43 | 94 | 99 | 38 | 97 |
|  | 8 | 92 | 99.9 | 99.99 | 96 | 99.9 | 99.9 | 98 | 99.7 |
| 7.5 | 0.5 | 39 | 0 | 0 | 22 | 24 | 60 | 39 | 35 |
|  | 1 | 29 | 0 | 27 | 27 | 77 | 73 | 64 | 84 |
|  | 2 | 20 | 16 | 63 | 21 | 82 | 98 | 79 | 97 |
|  | 4 | 94 | 85 | 98 | 48 | 98 | 99.6 | 95 | 99 |
|  | 8 | 94 | 99.9 | 99.96 | 99 | 99.9 | 99.9 | 99.7 | 99.7 |

EXAMPLE 7

The effect of the organic esters listed in Table 2 on the three fungi, *Aspergillus niger*, *Penicillium roqueforti*, and *Chaetomium globosum*, was determined in this example. The method used was that described in Example 1 of U.S. Pat. No. 3,306,810, which disclosure is hereby made a part of this application.

Growth was recorded on the basis on the following key:
4 = excellent
3 = good
2 = poor
1 = very poor, scant, questionable
0 = no growth The results are summarized in Table 2.

TABLE 2

Inhibition of *Aspergillus niger*, *Penicillium roqueforti*, and *Chaetomium globosum* by the compounds listed below in a pulp-substrate method after 15 days incubation

| Test organism | Concentration parts per million | β-Hydroxyethyl 2,3-dibromopropionate | β-Cyanoethyl 2-bromoacrylate | β-Bromoethyl 2,3-dibromopropionate | β-Chloroethyl 2,3-dibromopropionate | β-Chloropropyl 2,3-dibromopropionate | β-Cyanoethyl 2,3-dibromopropionate | Cyanomethyl 2,3-dibromopropionate | β-Cyanoethyl 2,3-dichloropropionate | β,γ-dibromopropyl 2,3-dibromopropionate | β,γ-dichloropropyl 2,3-dibromopropionate |
|---|---|---|---|---|---|---|---|---|---|---|---|
| A. niger | 1 | 4 | 4 | 4 | 4 | 4 | 4 | 4 | 4 | 4 | 4 |
|  | 3 | 4 | 0 | 3 | 4 | 4 | 3 | 3 | 3 | 4 | 3 |
|  | 5 | 4 | 0 | 0 | 0 | 4 | 0 | 2 | 4 | 0 | 0 |
|  | 10 | 4 | 0 | 0 | 0 | 4 | 0 | 0 | 4 | 0 | 0 |
|  | 15 | 4 | 0 | 0 | 0 | 0 | 0 | 0 | 4 | 0 | 0 |
|  | 25 | 0 | 0 | 0 | 0 | 0 | 0 | 0 | 4 | 0 | 0 |
|  | 50 | 0 | 0 | 0 | 0 | 0 | 0 | 0 | 0 | 0 | 0 |
| P. roqueforti | 1 | 4 | 4 | 4 | 4 | 4 | 4 | 3 | 4 | 4 | 4 |
|  | 3 | 4 | 0 | 2 | 0 | 4 | 0 | 0 | 4 | 0 | 0 |
|  | 5 | 4 | 0 | 1 | 0 | 4 | 0 | 0 | 0 | 0 | 0 |
|  | 10 | 2 | 0 | 0 | 0 | 0 | 0 | 0 | 0 | 0 | 0 |
|  | 15 | 0 | 0 | 0 | 0 | 0 | 0 | 0 | 0 | 0 | 0 |
|  | 25 | 0 | 0 | 0 | 0 | 0 | 0 | 0 | 0 | 0 | 0 |
|  | 50 | 0 | 0 | 0 | 0 | 0 | 0 | 0 | 0 | 0 | 0 |
| Ch. globosum | 1 | 4 | 0 | 4 | 4 | 4 | 0 | 4 | 4 | 3 | 3 |
|  | 3 | 0 | 0 | 0 | 0 | 0 | 0 | 0 | 0 | 0 | 0 |
|  | 5 | 0 | 0 | 0 | 0 | 0 | 0 | 0 | 0 | 0 | 0 |
|  | 10 | 0 | 0 | 0 | 0 | 0 | 0 | 0 | 0 | 0 | 0 |
|  | 15 | 0 | 0 | 0 | 0 | 0 | 0 | 0 | 0 | 0 | 0 |
|  | 25 | 0 | 0 | 0 | 0 | 0 | 0 | 0 | 0 | 0 | 0 |
|  | 50 | 0 | 0 | 0 | 0 | 0 | 0 | 0 | 0 | 0 | 0 |

EXAMPLE 8

This example is concerned with a lap pulp preservation test which simulates the conditions prevailing during the storage of moist groundwood lap pulp stock in pulp and paper mills.

The lap pulp preservation tests were conducted upon a pulp substrate consisting of specimens of spruce lap pulp which weigh 2.5 ± 0.1 grams each on an oven-dry basis and measured approximately 6 × 6 cm. Each test specimen was placed into a sterilized glass petri dish and the following sequence of operations performed in duplicate for various concentrations of organic esters of this invention.

1. A suitable amount of mineral salts was introduced into each test specimen of oven-dry lap pulp by uniformly distributing 2.0 milliliters of the following solution over the test specimen:

| Ammonium nitrate | 3.0 grams |
| Dipotassium phosphate | 1.0 gram |
| Potassium chloride | 0.25 gram |
| Magnesium sulfate | 0.25 gram |
| Polyoxyethylene derivative of sorbitan monooleate | 0.5 gram |
| Demineralized water | 1000 milliliters |

After the test specimens were uniformly wetted, the entire series of specimens was dried in an oven at 105° C. for 1 hour. The petri dish covers were left partially open to facilitate drying.

2. Two milliliters of a solution or dispersion in water containing the organic ester of this invention dissolved in water so as to provide the desired concentration in the test specimen was then added to the specimens. Untreated control specimens were prepared in duplicate by adding 2.0 milliliters of sterile water instead of the aqueous solution or dispersion of the compound being tested.

3. The final addition to each test specimen was that of the inoculum, which contained 0.5 gram (0.5 milliliter) of water. The pulp specimens thus contained 50 percent water and 50 percent pulp. The inoculum was prepared in the following manner. With the fungi *Aspergillus niger*, *Chaetomium globosum*, and *Pullularia pullulans*, suitable spore suspensions were readily obtained from mycophil or malt agar tube slants which were added carefully to the upper side of the prepared test specimens of lap pulp.

4. A tight-fitting wide rubber band was then placed over each petri dish with its inoculated lap pulp specimen to minimize the loss of moisture from the specimen during incubation. The temperature of incubation was 28° to 30° C. The results are summarized in Table 3 wherein the numerical values 0 to 4 have the same meaning as in Example 7.

TABLE 3

Inhibition of *Aspergillus niger*, *Chaetomium globosum*, and *Pullularia pullulans* by the compounds listed below in a lap pulp method after 14 days storage

| Test organism | Concentration parts per million | β-Chloroethyl 2,3-dibromopropionate | β-Chloropropyl 2,3-dibromopropionate | β-Cyanoethyl 2,3-dibromopropionate | β-Bromoethyl 2,3-dibromopropionate | β-Cyanoethyl 2,3-dichloropropionate | β-Methoxyethyl 2,3-dibromopropionate | β-Chloropropyl 2,3-dibromopropionate |
|---|---|---|---|---|---|---|---|---|
| A. niger | 10 | 3 | 4 | 4 | 4 | 4 | 4 | 4 |
|  | 25 | 0 | 4 | 3 | 2 | 4 | 2 | 4 |
|  | 50 | 0 | 3 | 1 | 0 | 4 | 0 | 3 |
|  | 75 | 0 | 0 | 0 | 0 | 4 | 0 | 0 |
|  | 100 | 0 | 0 | 0 | 0 | 3 | 0 | 0 |
|  | 200 | 0 | 0 | 0 | 0 | 2 | 0 | 0 |
| Ch. globosum | 10 | 3 | 4 | 4 | 4 | 4 | 4 | 4 |
|  | 25 | 0 | 4 | 0 | 3 | 4 | 0 | 4 |
|  | 50 | 0 | 2 | 0 | 0 | 4 | 0 | 2 |
|  | 75 | 0 | 0 | 0 | 0 | 3 | 0 | 0 |
|  | 100 | 0 | 0 | 0 | 0 | 0 | 0 | 0 |
|  | 200 | 0 | 0 | 0 | 0 | 0 | 0 | 0 |
| Pul. pullulans | 10 | 4 | 4 | 4 | 4 | 4 | 4 | 4 |
|  | 25 | 4 | 4 | 3 | 4 | 4 | 4 | 4 |
|  | 50 | 0 | 4 | 0 | 1 | 4 | 2 | 4 |
|  | 75 | 0 | 4 | 0 | 1 | 4 | 0 | 4 |
|  | 100 | 0 | 4 | 0 | 1 | 3 | 0 | 4 |
|  | 200 | 0 | 3 | 0 | 0 | 0 | 0 | 3 |

The organic esters of this invention may be used diluted with a carrier which may be liquid or solid. Dusts may be prepared with a finely divided solid such as talc, clay, pyrophyllite, diatomaceous earth, hydrated silica, calcium silicate, or magnesium carbonate. If desired, wetting and/or dispersing agents may be used. When the proportions of these are increased, there results a wettable powder, which may be dispersed in water and applied from a spray.

Dusts may contain 1 percent to 15 percent of one or more compounds of this invention, while wettable powders may contain up to 50 percent or more of one or more of these compounds.

A typical formulation of a wettable powder comprises 20 percent to 50 percent of the organic esters, 45 percent to 75 percent of one or more finely divided solids, 1 percent to 5 percent of a wetting agent, and 1 percent to 5 percent of a dispersing agent. Typical wetting agents include sodium dodecyl sulfate, sodium nonylbenzene sulfonate, sodium dioctyl sulfosuccinate, octylphen-oxypolyethoxyethanol, or other nonionic agents, such as ethylene and/or propylene oxide condensates with long chained alcohols, mercaptans, amines, or carboxylic acids. Typical dispersing agents include the sodium sulfonate of condensed naphthalene-formaldehyde and lignin sulfonates.

Liquid concentrates may also be used. These are prepared by taking up the organic esters in an organic solvent together with one or more surface active agents. For example, there may be mixed 60 parts of one of the organic esters, 20 parts of a surface-active solvent-soluble alkylphenoxypolyethoxyethanol and 20 parts of aromatic mineral spirits or xylene.

The compounds of this invention may be used in conjunction with other fungicidal agents and also in conjunction with miticides or insecticides or other pesticides.

While particular embodiments of the invention have been described, it will be understood, of course, that the invention is not limited thereto since many modifications may be made, and it is, therefore, contemplated to cover by the appended claims any such modifications as fall within the true spirit and scope of the invention.

The invention having thus been described, what is claimed and desired to be secured by Letters Patent is:

1. A method of inhibiting the growth and proliferation of bacteria and fungi in an aqueous system, which comprises contacting said bacteria and fungi with an amount sufficient to inhibit the growth and proliferation of said bacteria and fungi of an ester selected from the group consisting of cyanomethyl 2,3-dibromopropionate, beta-cyanoethyl-2-bromoacrylate, beta-cyanoethyl-2,3-dichloropropionate and beta-cyanoethyl-2,3-dibromopropionate.

2. A method of inhibiting the microbiological deterioration of wood pulp that is susceptible to deterioration by the action of micro-organisms in the presence of moisture, which comprises adding to said wood pulp an ester as defined in claim 1 in an amount sufficient to inhibit said microbiological deterioration.

3. A method of inhibiting the bacterial and fungal deterioration of wood chips that are susceptible to deterioration by the action of bacteria and fungi, which comprises treating said wood chips with an ester as defined in claim 1 in an amount sufficient to inhibit said bacterial and fungal deterioration.

4. A method of inhibiting the growth and proliferation of bacteria and fungi on seeds and living plants, which comprises treating said seeds and living plants with an ester as defined in claim 1 in an amount sufficient to inhibit the growth and proliferation of said bacteria and fungi.

5. The method of claim 2 wherein the ester is $\beta$-cyanoethyl 2,3-dibromopropionate.

6. The method of claim 3 wherein the ester is $\beta$-cyanoethyl 2,3-dibromopropionate.

7. The method of claim 4 wherein the ester is $\beta$-cyanoethyl 2,3-dibromopropionate.

* * * * *